United States Patent [19]

Mouille et al.

[11] Patent Number: 4,626,173
[45] Date of Patent: Dec. 2, 1986

[54] VARIABLE-PITCH MULTI-BLADE PROPELLER INCORPORATING INDIVIDUALLY DISMOUNTABLE BLADES MADE OF COMPOSITE MATERIALS, PROCESS FOR MANUFACTURING SUCH BLADES AND BLADES THUS PRODUCED

[75] Inventors: René L. Mouille; Marc Declerco; Jean-Pierre Jalaguier; Bernard Jaugey, all of Bouches-du-Rhône, France

[73] Assignee: Societe Nationale Industrielle et Aerospatiale, Paris, France

[21] Appl. No.: 587,649

[22] Filed: Mar. 8, 1984

[30] Foreign Application Priority Data

Mar. 18, 1983 [FR] France ................ 83 04448

[51] Int. Cl.⁴ .................. B64C 27/45; B64C 11/00
[52] U.S. Cl. .................. 416/134 A; 416/168 R; 416/226; 416/230
[58] Field of Search ............ 416/168 R, 226, 134 A, 416/230 A; 416/170 R, 136 R, 239

[56] References Cited

U.S. PATENT DOCUMENTS

| | | | |
|---|---|---|---|
| 3,303,889 | 2/1967 | Bates | 416/239 |
| 3,594,097 | 7/1971 | Mouille et al. | 416/136 |
| 3,754,840 | 8/1973 | Zincone | 416/226 |
| 3,765,267 | 10/1973 | Bourquardez et al. | 416/131 |
| 3,824,037 | 7/1974 | Mautz et al. | 416/134 A |
| 3,869,221 | 3/1975 | Wildner | 416/168 R |
| 3,923,422 | 12/1975 | Ianniello et al. | 416/226 |
| 3,950,115 | 4/1976 | Euler | 416/226 |
| 4,281,966 | 8/1981 | Duret et al. | 416/168 R |
| 4,302,155 | 11/1981 | Grimes et al. | 416/230 |
| 4,332,525 | 6/1982 | Cheney, Jr. | 416/226 |
| 4,375,940 | 3/1983 | Lovera et al. | 416/168 R |

FOREIGN PATENT DOCUMENTS

| | | | |
|---|---|---|---|
| EPA0019047 | 11/1980 | European Pat. Off. | |
| 2644945 | 4/1977 | Fed. Rep. of Germany | 416/168 R |
| 291958 | 12/1931 | Italy | 416/168 R |
| 299479 | 6/1954 | Switzerland | 416/168 R |
| 1302857 | 1/1973 | United Kingdom | |

*Primary Examiner*—Robert E. Garrett
*Assistant Examiner*—Joseph M. Pitko
*Attorney, Agent, or Firm*—Browdy and Neimark

[57] ABSTRACT

Each blade is fixed to the hub by the root part of the spar, arranged in the form of a loop surrounding a connection element bolted on the hub, with the interposition of rigid rings by a pin simultaneously fixing the hub on a drive sleeve transmitting thereto the driving torque of the central shaft. The hub comprises two coaxial cylindrical walls in each of which is pierced, for each blade, a circular opening in which the member for controlling the angle of attach which is fast with the blade root is mounted to rotate via self-lubricating rings. The invention is particularly applicable to helicopters.

16 Claims, 8 Drawing Figures

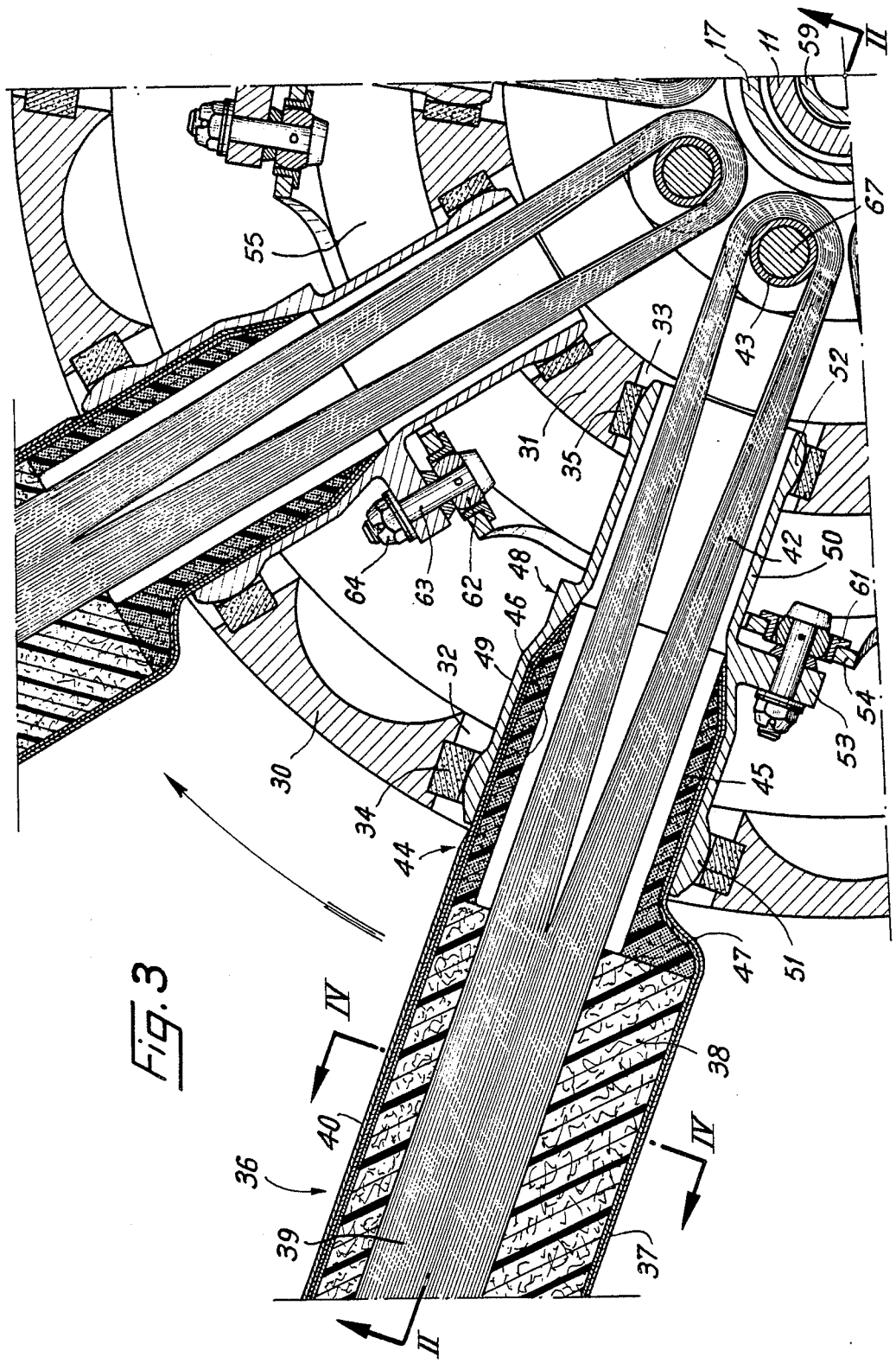

VARIABLE-PITCH MULTI-BLADE PROPELLER INCORPORATING INDIVIDUALLY DISMOUNTABLE BLADES MADE OF COMPOSITE MATERIALS, PROCESS FOR MANUFACTURING SUCH BLADES AND BLADES THUS PRODUCED

The present invention relates to multi-blade propellers and more precisely to a variable-pitch multi-blade propeller adapted to be used in particular as tail rotor of a rotorcraft, such as a helicopter, on which the rail rotor may be faired.

The invention also relates to a blade and to a process for manufacturing this blade, which is particularly intended for equipping a multi-blade propeller.

Variable-pitch multi-blade propellers, which may be used as tail rotors of the faired type for helicopters, are described in U.S. Pat. No. 3,594,097 and in U.S. Pat. No. 4,281,966.

In U.S. Pat. No. 3,594,097, each of the blades of the multi-blade propeller is connected, by an elongated radial element twistable about its longitudinal axis, to a hub driven in rotation by a rotor shaft about the axis of the propeller, and a fitting of the root of each blade in the hub allows both the rotation of the blade about its longitudinal axis and a slight angular movement of the blade in flap and in drag, whilst, for controlling the angle of attack, the root of each blade comprises a crankpin connected, by a ball joint, to a plate perpendicular to the axis of the propeller and axially movable.

Such a propeller, mounted as tail rotor, compensating the drive torque of a helicopter, in a window or an airflow delimited vertically in the rear part of the fuselage or in the vertical stabilizer of the helicopter by a fairing, is very advantageous insofar as it contributes considerable safety during manoeuvres of the helicopter near the ground, and, by reason of the fairing within which the propeller rotates, the blades of the latter are subjected to stresses weaker than those of a conventional tail rotor, which is not faired, this increasing their life duration.

However, such a multi-blade propeller presents a certain number of drawbacks. In particular, these blades are made of light metal. They are therefore subject to corrosion, erosion and to fatigue due to alternate stresses. Moreover, machining of the blades is long and delicate and therefore expensive, and this all the more so as, not only must the solid part of the blade subjected to the aerodynamic stresses be made with a profile and in accordance with a precise law of twist, exactly reproducible from one blade to the other, while being protected at the leading edge by employing a process of superficial hardening such as hard anodization, but also the blade root is likewise delicate and expensive to produce.

In fact, the blade root comprises, on the one hand, a hollow intermediate part in which are machined an axial recess adapted to receive the outer radial end equipped with a bushing of the elongated element connecting the blade to the hub, and a transverse bore opening in the axial recess and adapted to receive a shaft passing in the bushing and ensuring fastening of the blade root on the elongated element, and, on the other hand, a cylindrical end bearing, whose outer surface is superficially hardened by chromium-plating or anodization and whose central part is thinned, and which is adapted to allow rotation of the blade, about its longitudinal axis, to control the pitch.

To this end, this cylindrical bearing is mounted to slide and rotate in a radial sleeve made of relatively supple synthetic material with a low coefficient of friction, which is embedded over about half of its length towards the axis of the propeller in a radial cylindrical bore machined in the hub, and free towards the outside, each sleeve being held in place by a collar which is housed in a corresponding groove in the bore and immobilized in rotation by a stud passing through the wall of the bore. In order to effect such an assembly of the blade root, which constitutes a sort of semi-embedding on the hub, it is indispensable that the latter presents a rim having a large radial thickness, with the result that sufficiently long cylindrical bores may be pierced in this rim to serve as housing for the sleeves, which is disadvantageous from the standpoint of weight, manufacturing costs and the centrifugal efforts which stress this important eccentric mass constituted by two circular cheeks bolted one on the other.

Moreover, the disc or bottom of the hub, which connects the rim of the hub to the shaft of the rotor by being connected to a radial flange of the latter by a ring of bolts, must be of a thickness corresponding to the thickness of the rim, and this all the more so as, by reason of the assembly of the blade roots on the hub, the latter is subjected to bending stresses as well, moreover, as the bolts for fixing the hub to the shaft, as the bolts serve simultaneously for fixation on the shaft of the inner radial part of the elongated elements for connecting the blades to the hub. The hub therefore does not serve solely to transmit the drive torque from the rotor shaft to the blades, but it is actively stressed by forces which are transmitted thereto by the blades and the elongated connecting elements, up to its part connected to the rotor shaft, and it must therefore be dimensioned accordingly.

Furthermore, the crankpin for connecting the root of each blade to the axially movable plate in order to control the angle of attack is constituted by a lateral lever, fast with the inner radial end of the cylindrical bearing, and bearing a shaft provided with a spherical ring made of elastomer which just fits inside the eye of an axial yoke fast with the radial periphery of the plate; but nothing positively retains the elastic ring in the eye of the yoke. Finally, the elongated twistable element connecting each blade to the central part of the hub surrounding the shaft of the rotor is constituted by one of the arms of a star-shaped member comprising as many arms as the propeller comprises blades, all the arms being fast with one another by a central flat ring of this member, by which this member surrounds the shaft of the rotor and is connected to the latter by the ring of bolts. This star-shaped member is made by superposing a plurality of discs of thin sheet steel which are cut out in star form, with the result that each arm is formed by a bundle of thin leaves joined together, the outside leaves of the bundle being of smaller width than those of the inner leaves in order to distribute the torsional stresses uniformly between the different leaves which are, moreover, coated with an anti-friction plastic coating in order to avoid corrosions caused by contact.

This star-shaped metal member, which must be produced carefully and which is therefore expensive, is subjected to much stress and it must be regularly changed after a certain time in service or if it has been damaged.

Such a multi-blade propeller is therefore a member which is relatively expensive to manufacture and to maintain.

In U.S. Pat. No. 4,281,966, there is described a variable-pitch multi-blade propeller of simplified type, which overcomes a certain number of drawbacks associated with the embodiment set forth above and which essentially concern the limited service life of essential components, such as the star-shaped member and the blades, as well as the general complex architecture of the multi-blade propeller.

In the multi-blade propeller forming the subject matter of U.S. Pat. No. 4,281,966, two diametrically opposite blades are essentially constituted on the one hand by a common spar, made by a single elongated leaf of fibers with high mechanical resistance agglomerated by a synthetic resin, the leaf being fastened by its centre to a hub and, on the other hand, by two shells with aerodynamic profile fixed to the leaf on either side of the hub, the inner end of each shell being fast with a member for controlling the angle of attack of the corresponding blade, which is arranged so as to exert on the shell a torsional moment centred on the longitudinal axis of the elongated leaf. The latter is formed by two flat bundles of fibers, which are disposed so as to form at the centre of the leaf an opening allowing free passage of a shaft for collectively controlling the angle of attack of all the blades, this shaft being, as is the case in the embodiment described in U.S. Pat. No. 3,594,097, mounted to slide axially in the shaft of the rotor which is tubular. Moreover, the shell of each blade is joined over the whole of its length to the corresponding part of the leaf by a mass of adhesive synthetic material, cellular or foam, of low density and possibly presenting a certain residual elasticity. Each shell is essentially formed by layers of glass fiber fabrics and by a leading edge in stainless steel sheet, the whole being agglomerated by a synthetic resin polymerized so as to integrate the leading edge in the layers of fabrics.

The member for controlling the angle of attack is constituted by a sleeve cast in glass fiber reinforced synthetic material and which is connected to the root of each blade. A bearing surface, constituted by a circular metal ring, is embedded in or glued on the inner cylindrical end of the sleeve, coaxially ot the longitudinal axis of the blade, and a metal pitch control finger is embedded in a lateral arm borne by the inner end of the sleeve. By its bearing surface, each blade is mounted to rotate in a bearing of cast self-lubricating material, resting in semi-circular recesses made on the periphery on the one hand of an annular casing in the form of a dish, fast with the hub of the propeller and with its drive shaft, and on the other hand of a cover which surmounts the casing. The end of the shaft for collectively controlling the angle of attack of the blades, which passes through the hub, bears a plate substantially perpendicular to this axis and to which are fixed pairs of lugs provided with holes adapted for the engagement of the control fingers of the sleeves of two adjacent blades.

The advantages of this embodiment are that the structure of the device controlling the angle of attack is very simple and that each blade is also of simple, robust and light structure, virtually insensitive to the phenomena of erosion and to the notch effect, with the result that their service life is virtually unlimited. The multi-blade propeller thus produced is of much lower cost price and is much lighter than the propellers with metal blades. Moreover, its maintenance costs are much lower.

However, in the course of landing or take-off on unprepared areas, stones may penetrate in the airflow in which the propeller rotates and they may damage the blades thereof, further to which it is necessary to dismantle these blades in order to proceed with repair and/or replacement thereof. However, as the blades are arranged in pairs of opposite blades, having, for each pair, a common elongated leaf, at least one pair of blades for each deteriorated blade must be dismantled. This operation is extremely complex as the hub of the propeller is formed by a bonded stack comprising, in superposition, the median parts of all the elongated leaves as well as two outer layers of glass fiber fabrics impregnated with a polymerized synthetic resin, the whole of the stack being embedded in a synthetic filling material, and the hub thus constituted being fixed to the tubular drive shaft of the rotor by pairs of bolts which pass through the periphery of the bonded stack, on either side of the median part of each elongated leaf.

Dismantling of a pair of blades is therefore a major drawback, as it can only be carried out by taking apart the stack which constitutes the hub. This can only be carried out in the workshop, after having removed the cover and disconnected from the shaft of the rotor the assembly of the blades and the hub as well as the housing, and the blades from the lugs of the pitch control plate, and after having disconnected this plate from the shaft for collectively controlling the pitch in order to dismantle the propeller proper.

In order not to immobilize the helicopter on the ground for a prolonged period, it is necessary to reassemble a spare propeller, which supposes that the operator has such a spare propeller available. The necessity of replacing the blade and hub assembly as soon as one of the blades is damaged also involves, in this embodiment, considerable financial investment.

Finally, this embodiment must necessarily comprise an even number of blades, since these latter are fast in two's by common spars, which is disadvantageous, since the multi-blade propellers used as tail rotor of faired type have a much lower sound level when they comprise an odd number of blades.

It is an object of the present invention to propose, whilst conserving the advantages presented by the second embodiment described hereinabove over the first, to overcome the drawbacks of this second embodiment, thanks to a multi-blade propeller whose general architecture allows easy, rapid assembly, dismantling and maintenance of the different components of the propeller, and particularly of its blades, of which there is preferably an odd number, and which, when they present a structure according to the invention, improve reliability and reduce vulnerability of the multi-blade propeller which they equip.

To this end, the variable-pitch multi-blade propeller according to the invention, intended in particular to be used as tail rotor of rotorcraft, and which comprises:
a central shaft driven in rotation about a central axis,
a hub rotating with the central shaft about said axis,
blades, preferably in an odd number, each comprising
a shell with aerodynamic profile constituted by at least one layer of fiber fabrics with high mechanical resistance rigidified by a polymerized synthetic resin for impregnation, and of which the inner end extends by a blade root.
a filling body made of cellular or foam synthetic material disposed in the shell, a spar whose longitudinal axis is parallel to that of the blade and constituted by a single elongated leaf of fibers with high mechanical resistance agglomerated by a polymerized synthetic resin, of which the major part is fixed in the shell and of which one end part, emerging from the shell on passing through the blade root, forms a twistable and flexible root part by which the spar is connected to the hub, and such that the blade root is fast with a blade pitch control member, which is adapted to exert on the shell a torsional moment, substantially centred on the longitudinal axis of the spar, when this member is actuated by an assembly for collectively controlling the angle of attack of the blades, this member being, moreover, mounted to rotate in the hub about the longitudinal axis of the corresponding blade, wherein each blade is individually connected to the hub by the root part of the spar, which is arranged in a loop surrounding, by its inner end, a single connection element bolted on the hub.

Such a propeller allows easier maintenance insofar as each damaged blade may be dismantled rapidly and changed without it being necessary to dismantle other components of the propeller. In fact, each connection element if preferably axially traversed by the shank, with threaded end, of a single pin for connecting the connection element to an annular, flat, radial part of the hub, surrounding a central opening made in the latter to allow the coaxial arrangement of the hub about the central shaft.

Two rigid, radial, flat rings are advantageously disposed on either side of all the connection elements of the different blades and about the central shaft, and each present, for each connection element, a bore adapted to be aligned with the central passage of the corresponding connection element and to receive the shank of the single pin for connecting the connection element to the hub, in order to distribute the centrifugal forces from one connection element to the other. By transmitting the efforts from one of the connection elements to the other, these rings make it possible not to bend the shank of the single pin for connecting the connection element of a blade to the hub.

In order to ensure good support of the blade on the hub, the latter is advantageously in the form of a dish comprising two coaxial cylindrical walls radially spaced apart from each other and in each of which is pierced, for each blade of the propeller, a circular opening coaxial to the corresponding opening of the other wall and each centred on the longitudinal axis of the corresponding blade, the blade pitch control member being mounted to rotate in each of these two openings via a self-lubricating ring coaxial to the opening in which the ring is housed.

The blade pitch control member may be assembled under good conditions if the internal diameters of the opening made in the inner radial wall of the hub and of the self-lubricating ring housed in this opening are respectively less than the inner diameters of the opening pierced in the outer radial wall of the hub and of the self-lubricating ring housed in said latter opening, the member controlling the angle of attack of the corresponding blade presenting two coaxial circular bearing surfaces centred on the longitudinal axis of the blade, radially spaced apart from one another so that by its outer radial bearing surface, of which the outer diameter corresponds to the inner diameter of the outer radial ring, and by its inner radial bearing surface, of which the outer diameter corresponds to the inner diameter of the inner radial ring, this member may abut respectivley inside the outer and inner radial rings.

To ensure good connection with the root of the blade, this member for controlling the angle of attack is preferably a bearing in the form of a sleeve, traversed by the root part of the spar of the blade, covering the blade root and connected to the latter, for example by gluing, and of which each of the ends is surrounded by one of the two bearing surfaces.

If the blade root comprises a hollow cylinder whose inner end is truncated in form and a transition zone connecting the hollow cylinder to the shell of the blade, the sleeve comprises, in an embodiment particularly well adapted to its cooperation with the blade root, an outer cylindrical part of large diameter surrounding the hollow cylinder of the blade root and connected by an intermediate truncated part, by which the sleeve bears against the truncated inner end of the hollow cylinder, to an inner cylindrical part of small diameter.

Where the sleeve is made of metal and in one piece, it is advantageous if the two bearing surfaces are each constituted by one of two collars of spheroidal shape on the outer surface of the ends of the sleeve.

In order to reduce the radial efforts on the self-lubricating rings, it is advantageous if the member controlling the angle of attack also comprises, between its two bearing surfaces spaced apart from each other to a maximum, a lateral boss connected by a ball joint to one of the axial lugs, in a number equal to the number of blades, of a plate for controlling the angle of attack displaced axially, parallel to the axis of rotation, by a shaft for collectively controlling the angle of attack, mounted to slide axially in the central shaft which is tubular.

The propeller advantageously comprises, in addition, a driving sleeve, adapted to transmit the driving torque from the central shaft to the hub, and surrounding the central shaft, while being coaxial to the latter and rotating with the latter, this driving sleeve comprising an annular, outer radial flange for connection to an annular radial part of the hub.

In this case, the connection of the flange of the driving sleeve to the annular part of the hub may advantageously be ensured by the pins which, regularly distributed about the axis of rotation and in a number equal to the number of blades of the propeller, each simultaneously ensure retention, on this annular part of the hub, of a connection element of the root part of the spar of a blade.

If the drive of the central shaft is ensured by outer grooves thereon, by which it is in mesh on the one hand with inner grooves on a driving gear and on the other hand with inner grooves on the driving sleeve, which is separated from the gear by a seal-holder, it is advantageous, in order to avoid axial clearances, vibrations and deterioration of the elements of the axial stack constituted by the driving sleeve, the seal-holder and the driving gear, if an axial prestress device makes it possible to maintain a predetermined axial bearing force of the driving sleeve against the seal-holder and against the driving gear. Where the driving sleeve is maintained in axial position about the central shaft with the air of a tapped ring screwed at the end of the central shaft, the prestress device may comprise screws, screwed in tappings passing through the ring parallel to its axis, and of which the end of the shank of each is shaped as a bearing stud applied against a bearing surface at the bottom of a notch in the axial end face of the driving sleeve which is opposite the seal-holder.

It is a further object of the present invention to provide a blade adapted to equip a multi-blade propeller, and in particular a propeller which may be used as tail rotor of a rotorcraft.

Such a blade is described not only in the U.S. Pat. No. 4,281,966 mentioned above, but also in U.S. Pat. Nos. 3,647,317 and 4,306,837.

The first of these last mentioned two Patents describes an axial-flow ventilator propeller for cooling towers and heat exchangers in general, and this propeller is equipped with glass fiber blades. Each blade is essentially constituted by a profiled shell of glass fiber fabrics filled with a high-density polyurethane foam and in which is disposed a steel spar presenting a H-section and embedded in the filling foam to which the spar is chemically bonded.

Such a blade is advantageous in that its glass fiber skin offers exceptional resistance to corrosion and abrasion under severe environmental conditions. Moreover, the high-density polyurethane foam reinforces the profile over the whole span and efficiently transfers the loads applied on the skin to the spar, increasing the torsional stability and resistance to impacts of the blade.

However, this blade presents a major drawback, connected with the nature and shape of its spar, which is expensive to manufacture and is cumbersome, with the result that this solution cannot be used for making blades of small thickness and light weight.

In the second of the last mentioned two U.S. Patents mentioned above, which relates to a helicopter tail rotor with two diametrically opposite blades connected to each other by a common spar, each blade comprises a skin surrounding a preformed honeycomb filling body, the spar being constituted by a thin, flat strip of unidirectional fibers of high mechanical resistance, for example graphite, KEVLAR or glass, common to the two opposite blades and extending over the whole of their span, and which presents a relatively thick median part, forming the hub, to which are adjacent two finer, twistable and flexible parts which each extend by two end parts themselves each divided into two half-spars of which one is an upper surface half-spar and the other a lower surface half-spar each extending just beneath the corresponding skin part of the blade, between this skin and the filling body.

Likewise in this embodiment, the major drawback lies in the structure of the spar, common to the two opposite blades and in the form of an elongated, recumbent H, which is therefore complex and expensive to produce, The present invention proposes to produce a blade which presents the same advantageous features as those described in the state of the art, but whose structure is simpler and which is easier to produce.

To this end, the blade according to the invention, comprising:

a shell with aerodynamic profile, constituted by at least one layer of fiber fabrics with high mechanical resistance rigidified by a polymerized synthetic resin for impregnation, a filling body made of a cellular or foam synthetic material, disposed in the shell, a spar whose longitudinal axis is substantially parallel to that of the blade and constituted by a single elongated leaf of rovings of fibers with high mechanical resistance agglomerated by a polymerized synthetic resin, such that the major part of the leaf is fixed in the shell and of which an end part of the leaf, emerging from the shell, forms a twistable and flexible root part by which the spar is adapted to be connected to a hub, and preferably, a metal leading edge cover integrated in the shell, is such that the preformed filling body comprises a cut-out which extends over the whole length of this body, which opens in the face of the body turned towards the upper surface part of the shell and whose section corresponds substantially to that of the spar in that part thereof which is fixed in the shell, and so that the part of the spar which is fixed in the shell is disposed in the housing defined by the cut-out in the filling body and the upper surface part opposite the shell, and is directly fixed by its face turned towards the upper surface against this upper surface part of the shell.

The particularity of this assembled structure constituted by the shell, the filling body and the spar resides in the direct bond of one face of the spar, over the whole length thereof which is included in the shell, with the coating fabrics of the upper surface, which procures a bond of better quality between the spar and the coating by a direct bonding of one element on the other by a large surface, which leads to a better resistance to the centrifugal force, to the bending moments and to the torsional moment.

In order to ensure good torsional rigidity of the whole of the blade, the shell is constituted by a stack, from the outside to the inside, of at least one layer of fabrics of glass fibers or KEVLAR but preferably of two layers which are crossed and inclined by 45° with respect to the longitudinal axis of the blade, and of at least one layer of carbon fiber fabrics, but preferably two layers likewise crossed and inclined in similar manner.

The join, at the trailing edge, of the upper surface and lower surface fabrics forming the shell is advantageously reinforced by an inner yoke made of carbon fiber fabrics, bonded by its outer faces on the inner faces of the fabrics of the shell.

In order to simplify the connection of the blade to the hub, the root part of the spar arranged as a loop advantageously surrounds a connection element of the glade by its end opposite that spar part fixed in the shell.

In a particularly simple embodiment, the elongated leaf forming the spar is constituted by a single bundle of rovings which is folded on itself in two equal halves of which the inner parts adjacent the zone of fold, constitute the root part of the spar and of which the outer parts, remote from the zone of fold, are coupled to each other and constitute that part of the spar received in the shell.

The root of the blade, which is traversed by the root part of the spar, is preferably made with extensions of the or each layer of fiber fabrics constituting the shell and covering a stack of layers of fabrics of reinforcing fibers. This blade root is for example constituted by a hollow cylinder connected by its outer end to the general part of the blade by a transition zone and of which the inner end presents a truncated form, this facilitating the connection of the blade by its root on a member for controlling the angle of attack, covering the blade root.

It is also an object of the invention to provide a process for manufacturing such a blade, by means of a lower half-mould and an upper half-mould of which the complementary impressions have the form of the lower surface part and of the upper surface part of the blade, respectively.

The process according to the ivention consisting in depositing in the lower half-mould a foil of at least one layer of fabrics of fibers of high mechanical resistance, impregnated with a polymerizable synthetic resin and adapted to form the lower surface part of the shell of the blade, is such that it further consists in positioning, above this or these layers of fabrics, a preformed filling body made of a cellular or foam synthetic material presenting over the whole of its length a cut-out which opens in the face of the body turned towards the upper surface, in covering the rear edge of this filling body with a preformed yoke made of fabrics of carbon fibers, in disposing in the cut-out a part adapted to be fixed in the shell of a single elongated leaf of rovings of fibers of high mechanical resistance agglomerated by a polymerizable synthetic resin and adapted to constitute the spar of the shell, and of which an end part, adapted to form a root part of the spar, is disposed beyond a corresponding end of the filling body, in disposing on the assembly thus formed in the lower half-mould a foil of at least one layer of fabrics of fibers with high mechanical resistance impregnated with polymerizable synthetic resin and adapted to form the upper surface part of the shell of the blade, in preferably installing a metal cover at the leading edge in the lower half-mould, and finally in placing the upper half-mould on the lower half-mould and in polymerizing the or each resin impregnating and/or agglomerating the elements enclosed in the mould.

In the preferred variant embodiment, which makes it possible to mould and polymerize in a single mould and in one operation the general part of the blade, the part of spar fixed in this general blade part, and the root part of the spar, the process according to the invention consists in using a single thermosetting synthetic resin for impregnating the foils of each of the layers of fiber fabrics of the shell and of the trailing edge yoke and for agglomerating the rovings of the single elongated leaf of the spar, respectively after having cut out each layer in the form of an elongated layer comprising two adjacent foils on either side of a longitudinal median axis corresponding to the leading edge of the shell and adapted respectively to form the lower surface part and the upper surface part of the shell, and after having spread a single bundle of rovings folded on itself in two equal halves, in order to form the single leaf of the spar, and the process according to the invention further consists in leaving the foil of the upper surface part of each layer outside the lower half-mould when the foil of the lower surface part of the corresponding layer is deposited in the impression of the lower half-mould, then, after having positioned the filling body, the trailing edge yoke and the bundle of rovings, in folding down the foil of the upper surface part of each layer onto said body and on said bundle, before installation of the leading edge cover, the closure of the mould and a heat treatment for polymerizing the resin.

The invention will be more readily understood on reading the following description with reference to the accompanying drawings, in which:

FIG. 3 is a radial quarter section along III—III of FIG. 2.

FIG. 4 is a transverse section through a blade along IV—IV of FIG. 3.

FIG. 4a is a view on a larger scale of the trailing edge of the blade of FIG. 4, and FIGS. 5 to 7 illustrate the process for manufacturing each of the blades according to FIG. 4, equipping the rotor according to FIGS. 1 to 3.

Figure 1:
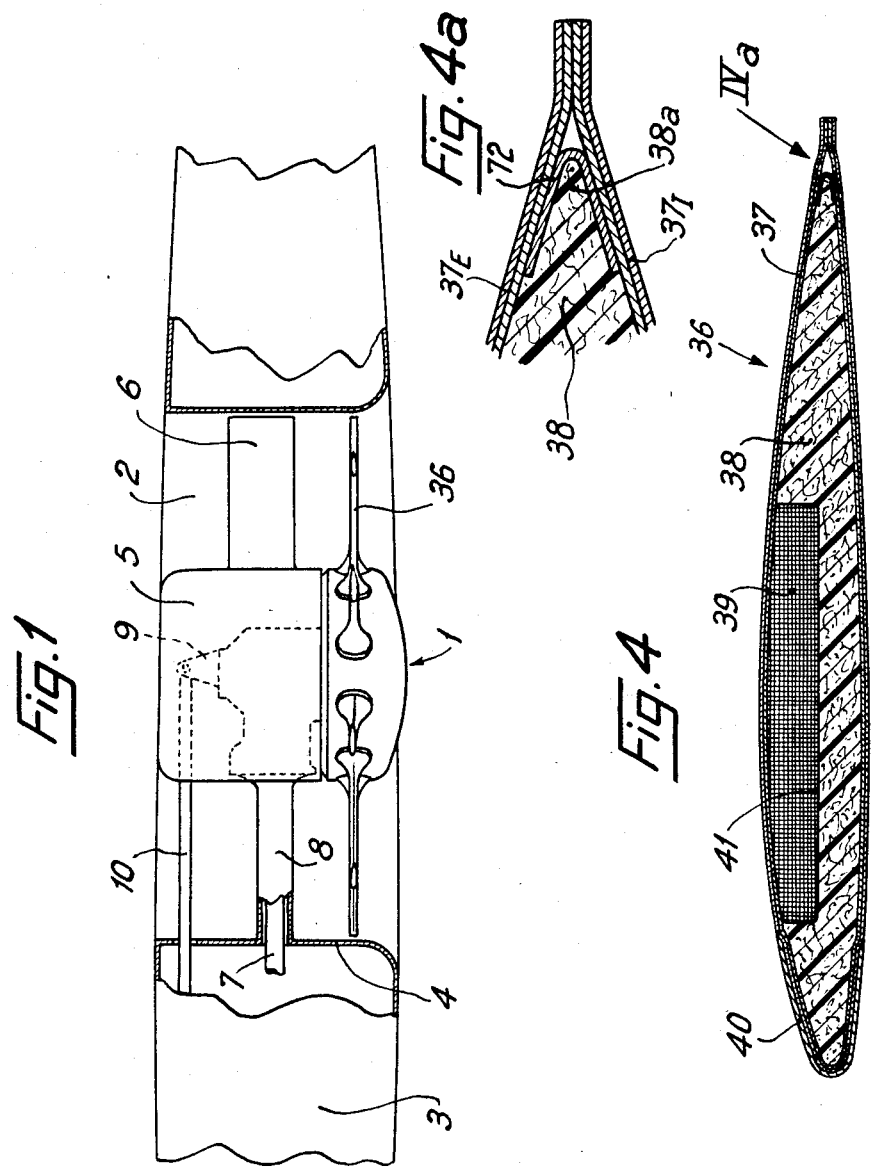
FIG. 1 is a horizontal section through the rear part of the fuselage of a helicopter equipped with a anti-torque rotor according to the invention.

Referring now to the drawings, FIG. 1 shows the multi-blade rotor used as anti-torque tail rotor, compensating the driving torque transmitted to at least one main rotor by a main gear box, and generally designated by 1, which is mounted and driven in rotation in a vertical airflow or window 2, of slightly truncated form, defined in the rear part of the fuselage or stabilizer 3 of a helicopter by a fairing 4. In the airflow 2, the rotor 1 is supported and driven by an auxiliary gear box 5 housed in a double-walled casing, generally cylindrical in form, maintained at the centre of the airflow 2 by a support comprising a plurality of faired radial arms 6.

The auxiliary gear box 5, which is for example such as the one described and shown in U.S. Pat. No. 3,594,097, to which reference may advantageously be made for further details, contains a bevel gear whose input gear is driven by a transmission shaft 7 connecting the main gear box to the auxiliary gear box 5, and passing through a hollow arm 8 connecting the fairing 4 to the casing of the auxiliary gear box 5. The latter also contains a bevel gear 9, stressed by a connecting rod 10 for collectively controlling the angle of attack in order to displace a shaft for collectively controlling the angle of attack, described hereinafter, parallel to the axis of the airflow 2. The bevel gear 9 and the connecting rod 10 have been schematically shown as in FIG. 1 of the Patent mentioned above, for the purposes of clarity, but the connecting rod 10 may possibly also pass through the hollow arm 8.

Figure 2:
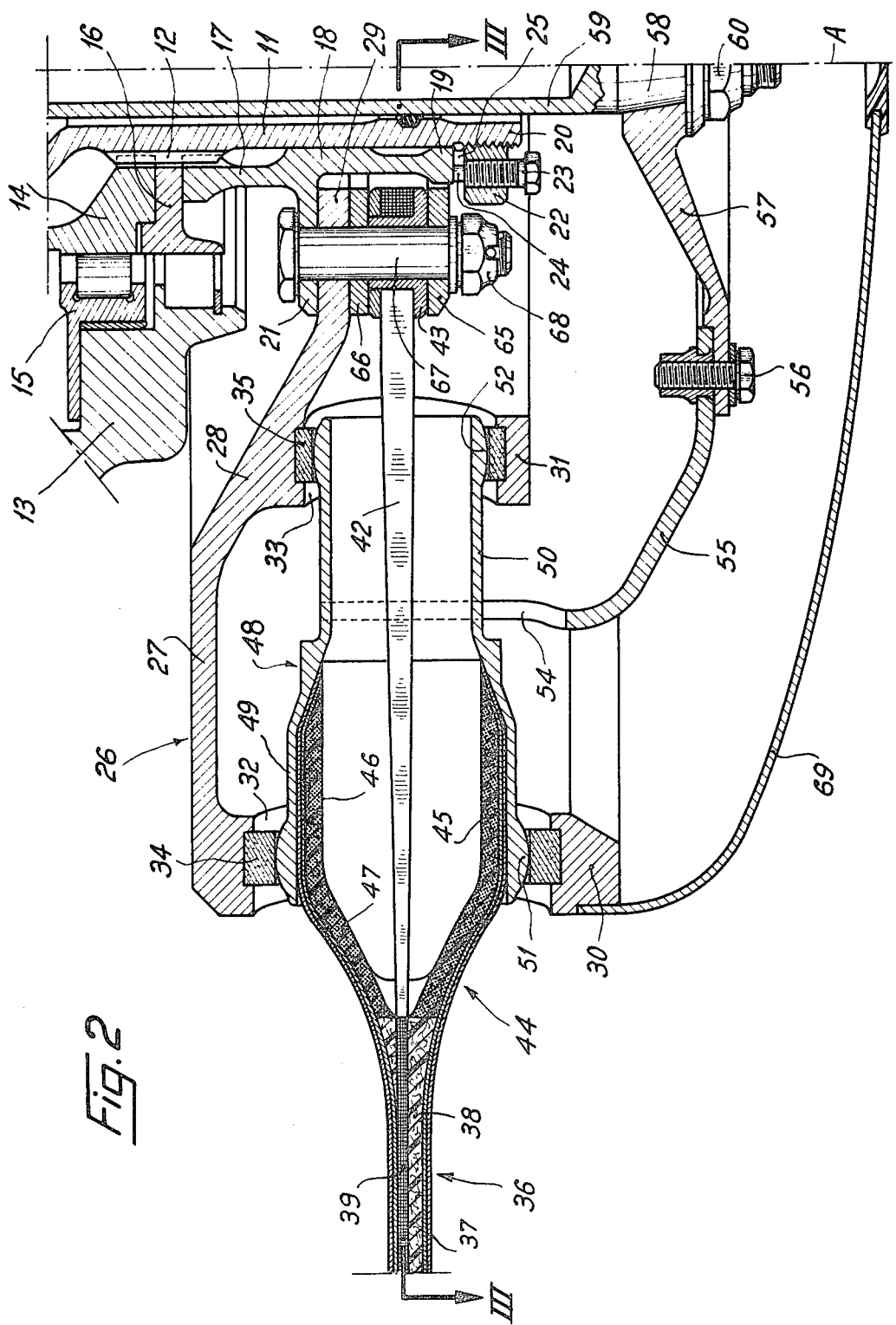
FIG. 2 is an axial half-section, along II—II of FIG. 3, of the rotor shown in FIG. 1.

With reference to FIGS. 2 and 3, the rotor 1 comprises a tubular central shaft 11 coaxial to the airflow 2, and mounted to rotate about the axis A of the airflow 2 by roller bearings housed in the auxiliary gear box 5. The shaft 11 is driven in rotation by axial grooves 12 in a part of shaft passing through the casing 13 of the auxiliary gear box 5, and which are in mesh with corresponding grooves on the secondary output gear 14 of the bevel gear housed in the auxiliary gear box 5, this secondary gear 14 itself being mounted to rotate in the casing 13 by a roller bearing 15. By its grooves 12, the shaft 11 is also in mesh with corresponding grooves on the inner axial end (i.e. facing the auxiliary gear box 5) of a driving sleeve 17 which is in axial abutment by this inner axial end against a seal-holder 16, clamped against the secondary gear 14. This sleeve 17, rotating with the shaft 11, is coaxial to the latter thanks to two inner cylindrical bearing surfaces 18 and 19 offset axially and such that the threaded outer axial end 20 of the shaft 11 projects with respect to the outer axial cylindrical bearing surface 19 of the sleeve 17. At its inner axial bearing surface 18, this sleeve 17 presents an outer radial annular flange 21 by which the sleeve 17 is fixed to the hub described hereinafter and to which the sleeve 17 transmits the driving torque received from the shaft 11, which receives it from the bevel gear 14, and the sleeve 17 also takes up part of the thrust efforts developed by the rotation of the blades described hereinafter. The sleeve 17 is maintained axially in place, by exerting a predetermined axial bearing force against the sealholder 16, by a tapped ring 22, screwed on the threaded end 20 of the shaft 11, and which is traversed by four axial bores regularly distributed over the ring 22 and in each of which is screwed a setting screw 23 of which the end of the shank, in the form of a bearing lug 24, is applied against a bearing surface at the bottom of a notch 25 made in the outer axial end face of the sleeve 17.

By applying a predetermined tightening torque on the heads of the four screws 23 which abut on the one hand on the ring 22 and on the other hand on the sleeve 17, an axial prestress is easily exerted on the axial stack constituted by the sleeve 17, the seal-holder 16 and the bevel gear 14, which makes it possible to take up the axial clearances and to avoid the vibrations and deterioration of the elements of this stack, the four screws 23 then being braked simultaneously.

The hub is substantially in the form of a circular cake mould provided with a central shaft. More precisely, the hub comprises a hub body 26, made of stamped sheet metal or an injected and possibly reinforced synthetic material, having the form of a dish whose bottom is constituted by a flat outer radial part 27 connected by a truncated intermediate part 28, directed towards the inside of the dish, to a flat, annular, inner, radial part 29 surrounding a central opening of diameter slightly larger than the outer diameter of the part of the sleeve 17 located axially outside the flange 21, so that the hub body 26 may be slid axially on this part of the sleeve 17, until it rests by the flat annular part 29 against the flange 21 of the sleeve 17. The hub body 26 is also constituted by two cylindrical walls coaxial to each other, of which one, 30, in outer radial position and connected by its inner axial end to the outer radial end of part 27 of the bottom, has a height greater than that of the other cylindrical wall 31, in inner radial position and connected by its inner axial end to the truncated part 28 of the bottom. In these two walls 30 and 31 are pierced, for each of the blades which the rotor must comprise, two coaxial circular openings 32 and 33 centred on a radial axis and such that the opening 32 in the outer wall 30 has a diameter larger than the diameter of the opening 33 in the inner wall 31. Two self-lubricating rings 34 and 35 are housed respectively in annular grooves made in the wall of the openings 32 and 33, the inner diameter of ring 34 being greater than that of the ring 35.

The rotor also comprises eleven blades 36 each being substantially 40 cm in length, 7.7 cm in width and having a law of twist of about 7°, and the structure of these blades 36 is described hereinbelow with reference not only to FIGS. 2 and 3 but also to FIGS. 4 and 4a.

Each blade 36 is essentially constituted, in its general part, by a shell 37 having the desired aerodynamic profile, by a preformed filling mass 38, a trailing edge yoke 72, a spar 39 and a leading edge cover 40 made of titanium or stainless steel.

The shell 37 is made of a stack constituted, from the ouside to the inside, by two superposed layers of fabrics of glass or KEVLAR (registered trademark) fibers disposed such that, for example, their warp yarns are crossed at right angles and inclined by 45° with respect to the longitudinal axis of the blade, and by two layers of carbon fiber fabrics, preferably likewise crossed and inclined at 45°, and the assembly of these four layers is agglomerated by a synthetic resin polymerized by heat-setting, so as to form a hollow body ensuring torsinal rigidity of the whole of the blade, in which the filling mass 38 does not present any resistance to shear.

This filling mass 38 is an element of foam or cellular synthetic material, of which the outer shape corresponds to the inner volume of the shell 37 in which it is enclosed, and which present a cut-out 41 of substantially rectangular section extending over the whole of its length and opening in the face of the mass 38 which is turned towards the upper surface of the blade 36.

A reinforcing yoke 72, preformed as a V, constituted by carbon fiber fabrics preimpregnated with synthetic resin, covers the rear edge 38a, on the trailing edge side of the blade 36, of the filling mass 38. This yoke 72 is bonded by its outer faces to the fabrics constituting the shell 37 and by its inner faces to the filling mass 38. This yoke 72 is essentially intended to ensure resistance of the shell 37 to the torsional moment and to the drag moments which stress it.

The spar 39 is a solid elongated leaf made of KEVLAR rovings agglomerated by a heat-setting synthetic resin and having, over about two thirds of its length which are received in the general part of the blade 36, a section which corresponds to that of the housing defined by the cut-out 41 of the filling mass 38 and by the lower face of the opposite part of the upper surface of the shell 37.

The spar 39 adapted to take up the centrifugal forces stressing the blade 36 in service constitutes, by the last third of its length which emerges from the general part of the blade, passing through the blade root described hereinbelow, a root part 42 in the form of a loop (cf. FIG. 3) whose thickness increases (cf. FIG. 2) from that part of the spar 39 received in the general part of the blade 36 towards the free end of the loop, which surrounds a metal element or spool 43 forming connection for the blade 36, being wound in a groove around this connection element 43.

In the general part of the blade 36, the particularity of the assembly of the shell 37, the filling mass 38 and the spar 39 lies in the direct bond of the face of the spar 39 which is not opposite one of the faces of the cut-out 41 in the filling mass 38 with the inner face of the inner layer of the coating fabrics of the upper surface part of the shell 37, over the whole length of the spar 39 which is received in the general part of the blade 36, i.e. over about the outside two thirds of the length of the spar 39.

This particular structure of the blade 36 is doubly interesting as it procures a connection of excellent quality between the spar 39 and the shell 37 by a direct bond of one element on the other over a large surface, which creates a better resistance to the centrifugal force, to the bending moments and to the torsional moment which stress the blade, and as the manufacture of the blade 36 in accordance with a process which will be described hereinafter is facilitated.

Each blade 36 further comprises a blade root 44, made with the layers of fiber fabrics of the coating or of the shell 37 and with layers of reinforcing fiber fabrics 45, in order to give the blade root 44 a sufficient thickness. This blade root 44 comprises a hollow cylinder 46, of which the inner radial end narrows into a frustrum of cone, and which is connected by its outer radial end to the general part of the blade 36 by a transition zone 47 extending over a length close to the chord of the blade 36. The blade root 44 is mounted by its hollow cylinder 46 in a bearing constituted by a metal sleeve 48 of aluminium alloy.

This sleeve 48 comprises two coaxial tubular parts 49 and 50, of circular section having different inner and outer diameters, and of which the cylindrical bores are connected by a truncated part. The hollow cylinder 46 of the blade root 44 and its truncated inner radial end are respectively covered by the tubular part 49 of larger inner and outer diameter and by the truncated part of the sleeve 48, and are respectively fixed to these two parts by adhesion. This form of the sleeve 48 promotes support thereof against the hollow cylinder 46 of the blade root 44 under the effect of the centrifugal force.

Around its inner radial end, facing the shaft 11 of the rotor, the part 50 of smaller inner and outer diameter of the sleeve 48 presents a collar 52 of spheroidal form whose maximum outer diameter corresponds to the inner diameter of the self-lubricating ring 35 housed in the opening 33 of the inner wall 31 of the hub 26. Similarly, a collar 51, likewise of speroidal form, and whose maximum outer diameter corresponds to the inner diameter of the self-lubricating ring 34 housed in the opening 32 of the outer wall 30 of the hub 26, is presented by the part 49 of larger inner and outer diameter of the sleeve 48, about its outer radial end, i.e. in the position of greatest distance vis-à-vis the collar 52 on the sleeve 48.

The latter also comprises a lateral boss 53, connected to the truncated part of the sleeve 48, between the two collars 51 and 52, and extending in a direction substantially perpendicular to the axis of the sleeve 48 as well as to the axis A of rotation of the rotor.

The dimensions and bulk of the sleeve 48 and of its lateral boss 53 are such that, by suitably inclining a blade 36 and its sleeve 48 after having introduced the inner radial end of the loop of the root part 42 and the metal connection element 43 as well as part 50 of the sleeve 48 in an opening 32 in the outer wall 30 of the hub, it is possible to pass the lateral boss 53 in this opening 32, then to engage part 50 of the sleeve 48 in the corresponding opening 33 and to position parts 49 and 50 so that the collars 51 and 52 come respectively in abutment inside the rings 34 and 35 of the openings 32 and 33.

In this position of the blade 36, the boss 53 is opposite one of a plurality of axial lugs 54, in a number equal to the number of blades 36 of the rotor, and of which the outer axial end is fast with an annular, convex control plate 55. By a ring of screw-nut assemblies 56, the inner radial edge of the control plate 55 is superposed and connected to the outer radial edge of a cheek 57 of truncated form, in order to present excellent rigidity, and which is mounted by conical fit of its central part on a conical spindle 58 of a shaft 59 for collectively controlling pitch, mounted to slide axially in the tubular shaft 11 of the rotor 11, the cheek 57 being retained on the pitch control shaft 59 by a flanged nut 60 screwed on the threaded outer axial end of the spindle 58.

Each of the axial lugs 54 of the plate 55 is pierced with a bore equipped with a ring 61 in which is received a ball joint 62 retained by a transverse pin on the shank and against the head of a pin 63, of which the threaded end of the shank passes through a bore in the boss 53 and receives a nut 64 cottered on the shank in screwed position.

Each boss 53 constitutes with the pin 63, the nut 64, the ball joint 62 and the lug 54 which correspond thereto, a lever for controlling the pitch of the blade 36 of which the root 44 is fast with the coresponding sleeve 48. The different pitch control levers thus contituted, the control plate 55, the cheek 57 and the shaft 59 for collectively controlling pitch, constitute an assembly for collectively controlling the pitch of the blades 36 of the rotor, such that any axial displacement of the shaft 59 in the tubular shaft 11 controls, via the pitch control levers, the application of a torsional moment on the sleeves 48, and therefore also on the blade roots 44 and the blades 36 about the longitudinal axes of these latter. This torsional moment provokes rotation of the sleeves 48 and therefore also of the blades 36 about the longitudinal axes of these latter, causing the root part 42 of the spar 39 to twist. Each pitch control lever is located between the two collars 51 and 52 of the corresponding bearing sleeve, which are in maximum spaced apart relationship with respect to each other, this making it possible to ensure a better support of each blade 36 and reducing the radial efforts exerted by the collars 51 and 52 on the corresponding self-lubricating rings 34 and 35.

Finally, when each blade 36 is suitably disposed in the hub 26 so that the collars 51 and 52 of the corresponding bearing sleeve 48 are in abutment inside the rings 34 and 35 of the corresponding openings 32 and 33, the metal connection elemetns 43 of the inner radial end of the loop-shaped root part 42 of the spar 39 is received between two metal rings 65 and 66 engaged around the driving sleeve 17, and by a single pin 67, of which the shank passes through aligned bores in the flange 21 of the sleeve 17, the central part 29 of the hub body 26 and the rings 65 and 66, as well as the central passage of the connection element 43, and on the threaded end of which is screwed a cottered nut 68, connection of this connection element 43 to the hub body 26 and to the flange 21 of the driving sleeve 17 is ensured, the metal rings 65 and 66 on either side of the connection element 43 ensuring distribution of the centrifugal forces from one connection element 43 to the other.

Finally, a convex cover 69 fixed, for example by screws, by its outer radial edge on the periphery of the outer radial wall 30 of the hub body 26, covers the assembly for collectively controlling the pitch of the blades 36 and protects the hub against the penetration of dust, stones, etc. . . .

In this embodiment, it is observed that the central part 29 of the hub body 26 works little and serves only to transmit the driving torque from the driving sleeve 17 to the blades 36, in order to rotate the latter. However, the hub body 26 takes up part of the bending efforts. This is obtained thanks to the favourable disposition of the support collars 51 and 52 of the bearing sleeves 48. Moreover, the rings 65 and 66 for distribution of the centrifugal efforts avoid any considerable stress of the driving sleeve 17 and prevent the fixing pins 67 from bending.

This embodiment allows easy assembly and dismantling of the different components of the multi-blade rotor, which considerably facilitates maintenance operations and reduces the cost of maintenance. In particular, it is easy to proceed with changing a damaged blade 36 without having to dismantle other elements, since it suffices to disconnect the corresponding boss 53 from the pin 63 by unscrewing the nut 64 and to disconnect the corresponding connection element 43 from the pin 67 by unscrewing nut 68. To this end, the cheek 57 may be perforated to allow access to the nut 68 without having to dismantle the cheek 57 and the plate 55 from the shaft 59, after disconnection of the bosses 53 from all the blades 36.

Figure 5:
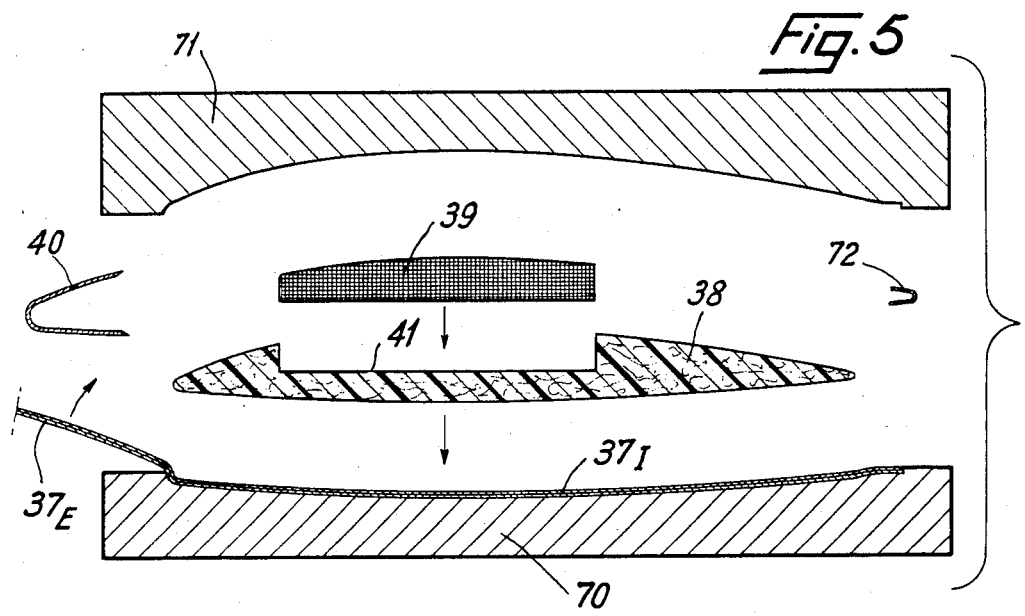
Figure 6:
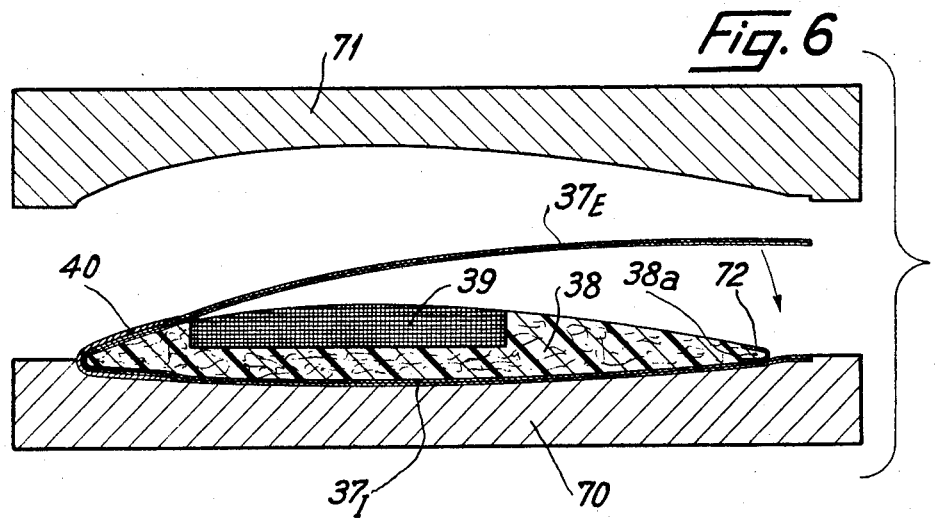
Figure 7:
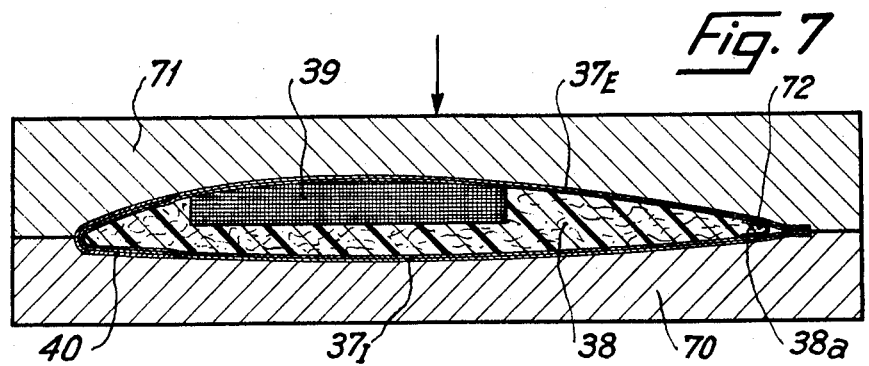

Referring to FIGS. 5 to 7, a process will now be described for manufacturing a blade such as 36 whose structure has been described with reference to FIGS. 2 to 4 and which is intended not only to equip a multi-blade propeller such as the one described previously and used as tail rotor of a helicopter, but also to equip ventilators or fans, particularly for blowers and air-conditioning or gaseous heat exchanger devices.

This process is carried out with the aid of two complementary halfmoulds of which the lower one 70 presents an inner impression whose form corresponds transversely and longitudinally to the form of the lower face of the blade 36, and of which the upper one 71 presents an inner impression whose form corresponds under the same conditions to that of the upper surface of the blade.

Two elongated layers of fabrics of glass or KEVLAR fibers are firstly cut out, then two elongated layers of carbon fiber fabrics, each layer comprising two adjacent foils 37 I and 37 E on either side of a longitudinal median axis corresponding to the leading edge of the shell 37 and adapted to form the lower surface part and the upper surface part of the shell 37 respectively. These layers of fabrics are pre-impregnated with a polymerizable synthetic resin, for example heat-setting. The foils 37 I formed by the two layers of glass or KEVLAR fiber fabrics are then deposited in the impression in the lower half-mould 70, leaving foils 37 E of these two layers outside the lower half-mould 70, on the leading edge side, then the two layers of carbon fiber fabrics are deposited in the same manner on these two layers, so that all the foils 37 I of the four layers of fiber fabrics forming the shell 37 are stacked in the lower half-mould 70, as shown in FIG. 5. The preformed filling mass 38 of cellular material or foam, of which the cut-out 41 opens upwardly, is then placed on this stack of foils 37 I. There is no difficulty in making this mass 38 in the desired shape in a second mould arranged to this end and this operation does not require further explanations. The reinforcing yoke 72 constituted by fabrics of carbon fibers preimpregnated with synthetic resin and preformed as a V in separate equipment is positioned on the rear edge 38*a* of the filling mass 38. Then the spar 39 constituted by an elongated leaf whose end part is formed as a loop, is deposited in the cut-out 41 in the preformed mass 38 in position in the lower half-mould 70. Manufacture of elongated leaves of this type, intended in particular to constitute the webs of the rotor blades of rotorcraft, is well known and does not need to be described in detail; it suffices to specify that leaves of this type may be constituted not only with rovings of KEVLAR fibers, but also with rovings of glass fibers or carbon fibers. All these rovings may be agglomerated for example by impregnating the bundle which they form with a polymerizable resin, particularly, a heat-setting one. This known process makes it possible to produce in particular thin, relatively narrow, elongated leaves which present mechanical properties which are particularly advantageous for making the webs of rotor blades of rotorcraft: in fact, they combine a high mechanical resistance in the longitudinal direction, enabling them to absorb the centrifugal forces applied to the blades of which they constitute the spars, without excessive stress nor fatigue, with relative suppleness, in particular in twist about their longitudinal axis, which makes it possible to control the respective angles of attack of the blades by exerting on the elongated leaves torsional moments centred on their longitudinal axis, and of relatively low value.

In this precise example, the spar 39 is constituted by a single elongated bundle of rovings which is folded on itself at the centre of its length and of which the two end parts extending over about two thirds of each half of the bundle are coupled in order to constitute the portion of the spar intended to extend in the general part of the blade 38, whilst the median part of the bundle, extending over about one third of each half on either side of the centre of the length of the bundle is intended to constitute the twistable, flexible, loop-shaped root portion 42, after folding the bundle on itself in two equal halves. The bundle of rovings impregnated with heat-setting resin is therefore spread out in the cut-out 41 in the filling mass 38, then the foils 37 E of the layers of fabrics of coating fibers are folded onto the mass 38 and the bundle of rovings, and the titanium or stainless steel sheet cover 40 is then installed on the leading edge, as shown in FIG. 6. As shown in FIG. 7, the upper half-mould 71 is then placed on the lower half-mould 70 and the whole of their contents is polymerized by heat treatment, this ensuring integration of the leading edge cover 40 in the fabrics of the rigidified shell and which adheres by the whole of its inner suface either on the mass 38, or at the level of foils 37 E of the upper surface part directly on the spar 39, of which the rovings are agglomerated.

The transition zone 47 and the hollow cylinder 46 of the blade root 44 may be made simultaneously thanks to longitudinal recesses of complementary shape made in that part of the half-moulds corresponding to the blade root and in which is disposed a hollow mandrel, traversed by that portion of the bundle of rovings constituting the loop-shaped root 42. This mandrel, surrounded by the layers of reinforcing fiber fabrics 45 is disposed in the recess of the lower half-mould 70 above the parts of the layers of coating fabrics extending the foils 37 I previously disposed in the impression of this half-mould 70. When the foils 37 E are folded down, parts of coating layers extending the latter are folded down above the mandrel and the reinforcing layers 45. The general part of the blade 36, the corresponding portion of the spar 39, the blade root 44 and the twistable, flexible, loop-shaped root portion 42 of the spar are thus moulded and polymerized in a single mould and by a single heat treatment.

In order to facilitate the loop arrangement of the central part of the bundle of rovings folded on itself, a wedge-shaped element may be provided in the lower half-mould 70, around which the bundle of rovings is spread. In its central part, the latter presents a thickness which progressively increases towards the centre of its length, as shown in FIG. 2. Similary, it may present a width which decreases slightly and progressively from each of its two ends towards its central part, with the result that the portion of the spar 39 housed in the general part of the blade 36 widens towards its outer radial end and thus opposes tear by the centrifugal force of the filling mass 38 and the shell 37.

We claim:

1. In a variable-pitch multi-blade propeller intended in particular to be used as tail rotor of a rotorcraft, and comprising:
    a central shaft driven in rotation about a central axis,
    a hub rotating with said central shaft about said axis,
    blades, preferably in an odd number, each comprising
        a shell with aerodynamic profile constituted by at least one layer of fiber fabrics with high mechanical resistance rigidified by a polymerized synthetic resin for impregnation, and having an inner end which extends by a blade root,
        a filling body made of cellular or foam synthetic material disposed in said shell,
        a spar having a longitudinal axis substantially parallel to that of said blade and constituted by a single elongated leaf of fibers with high mechanical resistance agglomerated by a polymerized synthetic resin, of which the major part is fixed in said shell and of which one inner end part, emerging from said shell on passing through said blade root, forms a twistable and flexible root part by which said spar is connected to said hub, said blade root being fast with a pitch control member which is adapted to exert on said shell a torsional moment, substantially centred on said spar longitudinal axis, when said pitch control member is actuated by an assembly for collectively controlling the pitch of said blades, and which is mounted to rotate in said hub about said blade longitudinal axis and wherein (a) each blade is individually connected to said hub by said spar root part which is arranged in the form of a loop having an inner end surrounding a single connection element bolted on said hub, (b) said hub has, for each said blade, two axially extending parts which are radially spaced apart from each other, and in each of which there is an opening which is coaxial with the opening of the other hub part, and (c) said blade pitch control member is rotatably mounted in said two coaxial openings.

2. The propeller of claim 1, wherein said hub has an annular flat inner radial part surrounding a central opening made in said hub to allow the coaxial arrangment of said hub about said central shaft, and each connection element is a tubular element connected to said annular flat inner radial hub part by means of a single pin having a shank with threaded end and axially traversing said tubular connection element.

3. The propeller of claim 1, wherein two rigid radial flat rings are disposed on either side of said blade connection elements, and about said central shaft, each said connection element has a central passage, and each said flat ring presents, for each said connection element, a bore adapted to be aligned with said central passage, and said connection element is connected to said hub by means of a single pin having a shank received in said central passage and in the corresponding bore of each said flat ring.

4. The propeller of claim 1, wherein said hub is in the form of a dish comprising two coaxial cylindrical walls radially spaced apart from each other and forming said two axially extending hub parts in which are pierced said two coaxial openings which are of circular sahpe and each centred on said blade longitudinal axis and housing a coaxial self-lubricating ring for rotatably mounting said blade pitch control member.

5. The propeller of claim 4, wherein the inner diameters of the opening made in the inner radial wall of said hub and of the self-lubricating ring housed in this opening are respectively less than the inner diameters of the opening pierced in the outer radial wall of said hub and of the self-lubricating ring housed in this opening, and said blade pitch control member presents two coaxial circular bearing surfaces centred on said blade, longitudinal axis, radially spaced apart from one another so that by its outer radial bearing surface, of which the outer diameter corresponds to the inner diameter of said outer radial ring, and by its inner radial bearing surface, of which the outer diameter corresponds to the inner diameter of said inner radial ring, said pitch control member abuts respectively inside said outer and inner radial rings.

6. The propeller of claim 5, wherein said pitch control member is a bearing in the form of a sleeve, traversed by said spar root part, covering said blade root and connected to the latter, for example by gluing, and of which each of the ends is surrounded by one of said two bearing surfaces.

7. The propeller of claim 6, wherein said blade root comprises a hollow cylinder whose inner end is truncated in form and a transition zone connecting said hollow cylinder to said blade shell, an said sleeve comprises an outer cylindrical part of large diameter surrounding said blade root hollow cylinder and connected by an intermediate truncated part, by which said sleeve bears against said hollow cylinder truncated inner end, to an inner cylindrical part of small diameter.

8. The propeller of claim 7, wherein said two bearing surfaces are each constituted by one of two collars of spheroidal shape each formed on the outer surface of a corresponding sleeve end, and in one piece with said sleeve which is made of metal.

9. The propeller of claim 5, wherein said blade pitch control member also comprises, between said two bearing surfaces, a lateral boss connected by a ball joint to one of several axial lugs, in a number equal to the number of blades of the propeller, of a pitch control plate displaced axially, parallel to said axis of rotation, by a shaft for collectively controlling the blade pitch and mounted to slide axially in said central shaft which is tubular.

10. The propeller of claim 9, wherein said control plate is an annular, convex plate connected to said shaft for collectively controlling the blade pitch by a cheek of truncated shape mounted by conical fit on said shaft.

11. The propeller of claim 9, wherein each of said axial plate lugs presents a ringed bore in which is received a ball joint retained on a shank fixed to the corresponding lateral boss.

12. The propeller of claim 1, wherein it comprises, in addition, a driving sleeve, adapted to transmit the driving torque from said central shaft to said hub and surrounding said central shaft, being coaxial to the latter an rotating with the latter and comprising an annular, outer radial flange for connection to an annular radial part of said hub.

13. The propeller of claim 12, wherein the connection of said driving sleeve flange to said hub annular part is ensured by pins regularly distributed about said axis of rotation, in a number equal to the number of blades of the propeller, and of which each simultaneously ensures retention, on said hub annular part, of a connection element of said spar root part of a blade, in cooperation with a nut screwed on a threaded end of a shank of the corresponding pin which passes through bores formed in said flange and said hub annular part and which are aligned with a central passage of said connection element.

14. The propeller of claim 12, wherein said driving sleeve is maintained in axial position about said central shaft with the aid of a tapped ring screwed at the end of said central shaft.

15. The propeller of claim 12, wherein said central shaft bears outer grooves by which it is in mesh on the one hand with inner grooves on a bevel gear and on the other hand with inner grooves on said driving sleeve, separated from said bevel gear by a seal-holder, and an axial prestress device maintains a predetermined axial bearing force of said driving sleeve against said seal-holder and said bevel gear.

16. The propeller of claim 15, wherein said driving sleeve is maintained in axial position about said central shaft by means of a tapped ring screwed on the end of said central shaft and wherein said prestress device comprises screws, screwed in tappings passing through said tapped ring parallel to its axis, and each of which has a shank with an end shaped as a bearing stud applied against a bearing surface at the bottom of a notch in the axial end face of said driving sleeve which is opposite said seal-holder.

* * * * *